(12) United States Patent
Bosveld et al.

(10) Patent No.: US 8,955,558 B2
(45) Date of Patent: Feb. 17, 2015

(54) HOPPER VALVE FOR EXTRUSION-BASED ADDITIVE MANUFACTURING SYSTEMS, AND METHODS OF USE THEREOF

(75) Inventors: Michael D. Bosveld, Bloomington, MN (US); John A. Bushey, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 274 days.

(21) Appl. No.: 13/525,793

(22) Filed: Jun. 18, 2012

(65) Prior Publication Data

US 2013/0333798 A1 Dec. 19, 2013

(51) Int. Cl.
*B65B 1/04* (2006.01)

(52) U.S. Cl.
USPC .............. 141/18; 141/2; 141/193; 141/232; 141/359

(58) Field of Classification Search
CPC .. B65B 1/04; B29C 67/0051; B29C 67/0074; B29C 67/0081; B29C 67/0085
USPC .............. 141/2, 18, 100–104, 192–193, 141/231–232, 351, 359–360
See application file for complete search history.

(56) References Cited

U.S. PATENT DOCUMENTS

| 3,123,107 | A | * | 3/1964 | Kappler | 141/352 |
| 4,163,464 | A | * | 8/1979 | Velling et al. | 141/198 |
| 4,834,151 | A | * | 5/1989 | Law | 141/198 |
| 5,029,624 | A | * | 7/1991 | McCunn et al. | 141/346 |
| 5,060,701 | A | * | 10/1991 | McCunn et al. | 141/21 |
| 5,125,438 | A | * | 6/1992 | McCunn et al. | 141/1 |
| 5,224,527 | A | * | 7/1993 | McCunn et al. | 141/346 |
| 5,249,611 | A | * | 10/1993 | Law | 141/198 |
| 5,255,720 | A | * | 10/1993 | McPherson | 141/86 |
| 5,312,224 | A | | 5/1994 | Batchelder et al. | 415/73 |
| 5,379,812 | A | * | 1/1995 | McCunn et al. | 141/346 |
| 5,419,378 | A | * | 5/1995 | Law | 141/198 |
| 5,503,785 | A | | 4/1996 | Crump et al. | 264/40.7 |
| 5,507,328 | A | * | 4/1996 | Donovan | 141/291 |
| 5,704,408 | A | * | 1/1998 | Law | 141/198 |
| 5,738,153 | A | * | 4/1998 | Gerling et al. | 141/83 |
| 5,762,117 | A | * | 6/1998 | Law | 141/198 |
| 5,764,521 | A | | 6/1998 | Batchelder et al. | 364/475 |
| 6,024,141 | A | * | 2/2000 | Wegman | 141/59 |
| 6,032,705 | A | | 3/2000 | Murphy et al. | 141/346 |
| 6,056,025 | A | * | 5/2000 | Wegman | 141/67 |
| 6,070,107 | A | | 5/2000 | Lombardi et al. | 700/119 |
| 6,098,677 | A | * | 8/2000 | Wegman et al. | 141/256 |
| 6,102,088 | A | * | 8/2000 | Wegman | 141/286 |
| 6,228,923 | B1 | | 5/2001 | Lombardi et al. | 524/425 |
| 6,435,380 | B1 | * | 8/2002 | Raboin | 222/484 |
| 6,790,403 | B1 | | 9/2004 | Priedeman, Jr. et al. | 264/442 |
| 7,828,022 | B2 | * | 11/2010 | Davidson et al. | 141/18 |
| 7,891,964 | B2 | | 2/2011 | Skubic et al. | 425/375 |
| 8,185,229 | B2 | * | 5/2012 | Davidson | 700/118 |
| 2009/0194189 | A1 | * | 8/2009 | Bordere et al. | 141/2 |
| 2009/0263582 | A1 | | 10/2009 | Batchelder | 427/256 |
| 2010/0096072 | A1 | | 4/2010 | Hopkins et al. | 156/155 |
| 2010/0100224 | A1 | | 4/2010 | Comb et al. | 700/118 |

* cited by examiner

*Primary Examiner* — Nicolas A Arnett
(74) *Attorney, Agent, or Firm* — Brian R. Morrison; Westman, Champlin & Koehler, P.A.

(57) ABSTRACT

A hopper valve for transferring particles from a supply container to a hopper, the hopper valve comprising a valve body coupled to the supply container, a fill tube moveably coupled to the valve body, and a foot member moveably coupled to the fill tube and configured to engage the hopper.

13 Claims, 16 Drawing Sheets

HOPPER VALVE FOR EXTRUSION-BASED ADDITIVE MANUFACTURING SYSTEMS, AND METHODS OF USE THEREOF

BACKGROUND

The present disclosure relates to additive manufacturing systems for building three-dimensional (3D) parts with layer-based, additive manufacturing techniques. In particular, the present disclosure relates to hopper fill assemblies for supplying particle materials to extrusion heads of the additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a hopper valve for transferring particles from a supply container to a hopper. The hopper valve includes a valve body, a fill tube, and a foot member. The valve body is configured to couple to the supply container, and has at least one fill port. The fill tube is moveably coupled to the valve body, and has at least one slot. The foot member moveably coupled to the fill tube and configured to engage the hopper. The hopper valve also includes a first biasing component configured to bias the fill tube in a first direction relative to the valve body, and a second biasing component configured to bias the foot member in the first direction relative to the valve body. At least one slot of the fill tube is configured to align with at least one fill port of the valve body when the fill tube is moved against the bias of the first biasing component.

Another aspect of the present disclosure is directed to an additive manufacturing system that includes a gantry, a viscosity pump carried by the gantry and configured to build a three-dimensional part in a layer-by-layer manner from particles of a part material, a hopper configured to provide the particles to the viscosity pump, a supply container configured to retain a supply of the particles, and a hopper valve retained by the supply container. The hopper valve includes a valve body coupled to the supply container, a fill tube slidably coupled to the valve body between an open state for transferring the particles from the supply container to the hopper and a closed state and a foot member slidably coupled to the fill tube and configured to engage the hopper.

Another aspect of the present disclosure is directed to a method for transferring particles from a supply container to a hopper. The method includes providing a hopper valve having a valve body retained by the supply container, a fill tube in a closed state, and a foot member, and engaging a top wall of the hopper with the foot member. The method also includes moving the fill tube downward relative to the engaged foot member to insert a portion of the fill tube through a port in the top wall of the hopper, and moving the inserted fill tube upward relative to the valve body to switch the inserted fill tube from the closed state to an open state. The method further includes directing the particles from the supply container, through the inserted fill tube in the open state, and into the hopper.

4A-4I are sectional illustrations depicting a process for filling the hopper for the viscosity pump with the use of the hopper valve.

Figure 5:
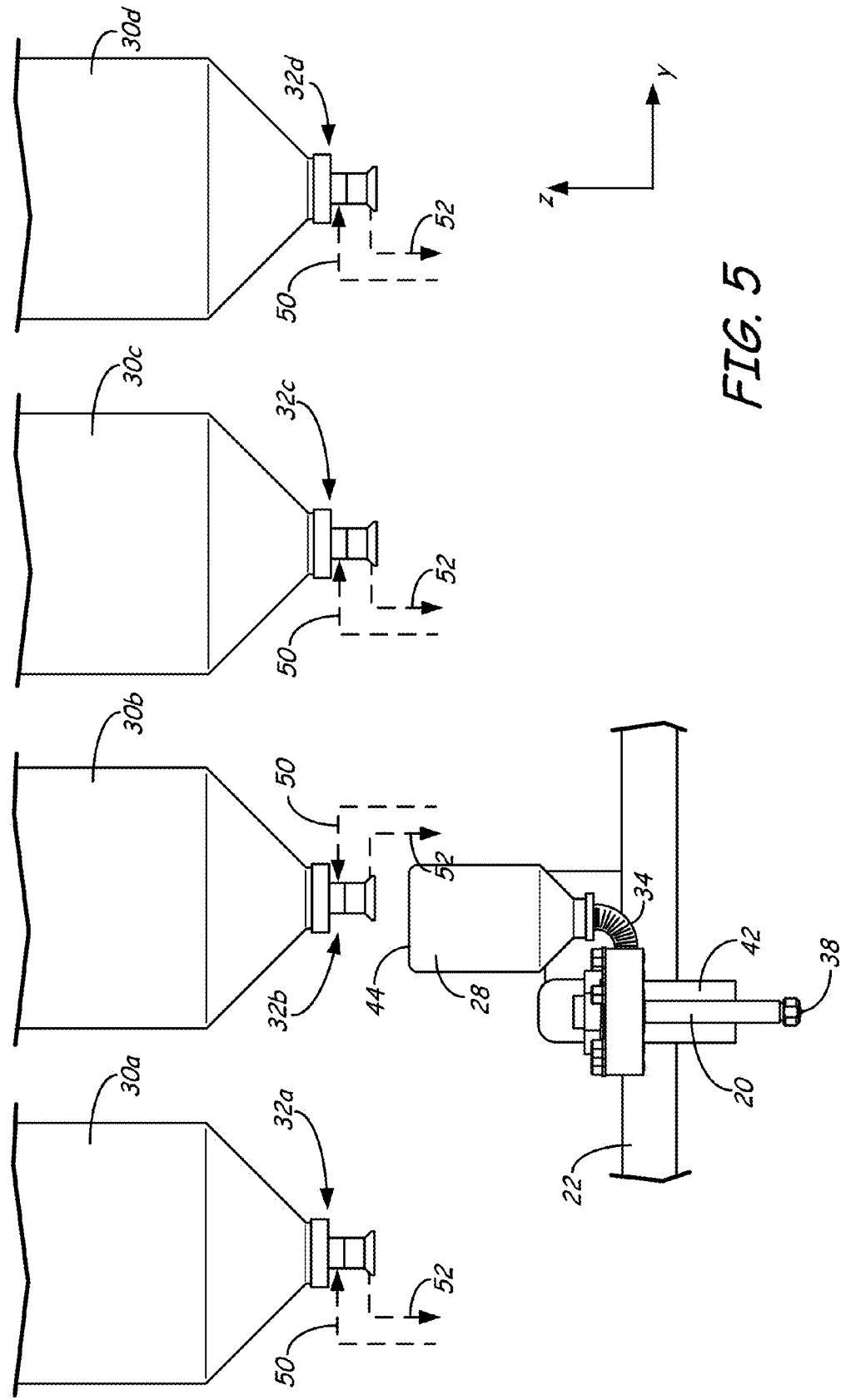

FIG. 5 is a schematic illustration of an alternative assembly which includes multiple supply containers, each having a hopper valve of the present disclosure.

DETAILED DESCRIPTION

The present disclosure is directed to a hopper valve retained by a supply container, where the hopper valve is configured to engage with a separate hopper for transferring particles (e.g., of part or support materials) from the supply container to the hopper. The hopper itself may function as a local supply for a moveable viscosity pump, allowing the viscosity pump to print 3D parts or support structures from the supplied particles using a layer-based, additive manufacturing technique. As discussed below, the hopper valve provides a provides an effective particle-transfer interface for filling the hopper in a clean and reliable manner, such as when the hopper has partially or completely exhausted its supply of the particles.

Figure 1:
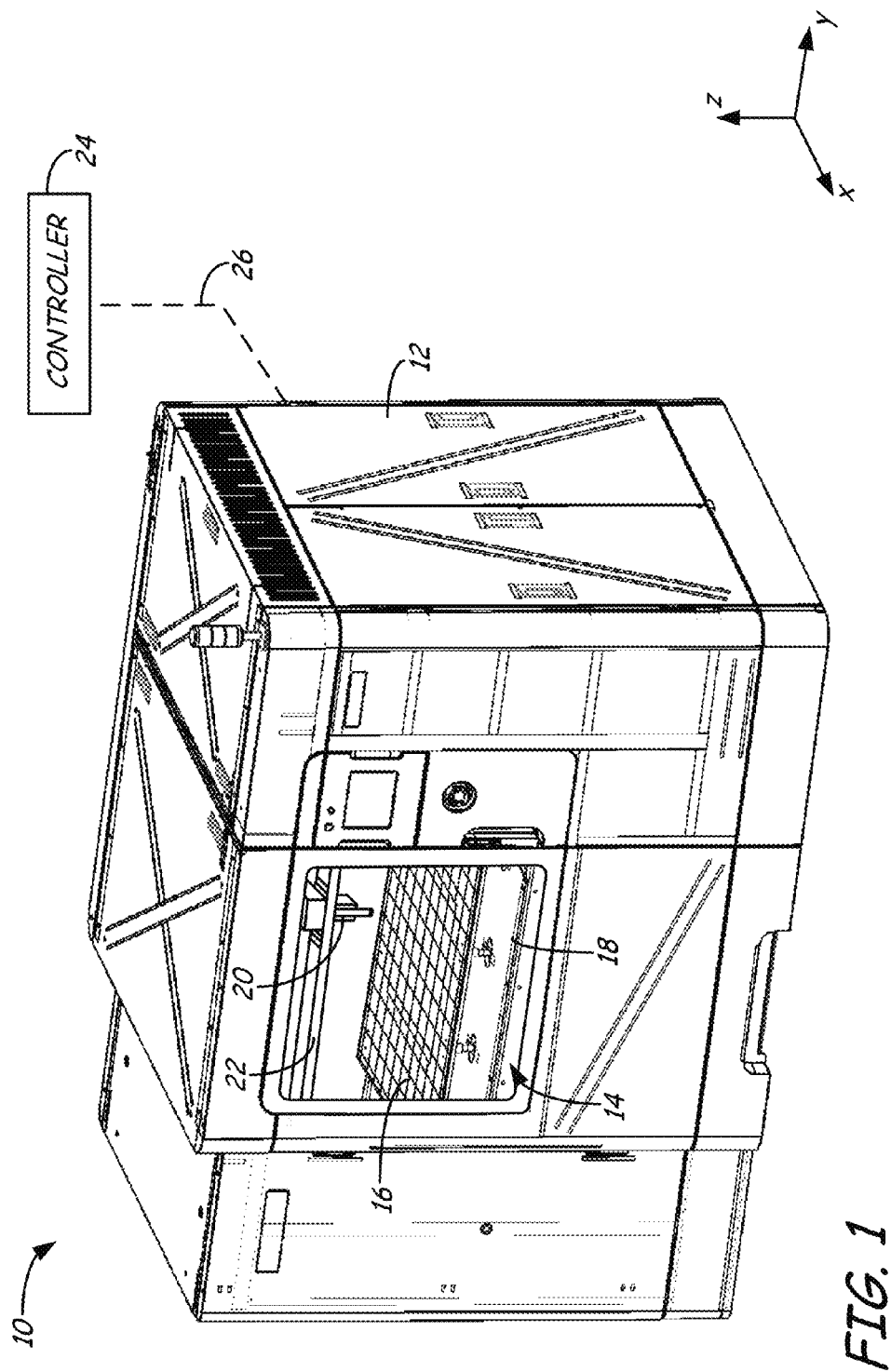
FIG. 1 is a top, front perspective view of an additive manufacturing system that incorporates a particle-fed viscosity pump.

As shown in FIG. 1, system 10 is an additive manufacturing system for printing 3D parts or models and/or corresponding support structures from particle-based media (e.g., particle-based part and support materials) using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING".

As shown, system 10 includes system casing 12, build chamber 14, platen 16, platen gantry 18, viscosity pump 20, and head gantry 22. System casing 12 is a structural component of system 10 and may include multiple structural subcomponents such as support frames, housing walls, and the like. In the shown embodiment, system casing 12 defines the dimensions of build chamber 14.

Build chamber 14 is an enclosed environment that contains platen 16 for printing 3D parts and support structures. Build chamber 14 may be heated (e.g., with circulating heated air) to reduce the rate at which the part and support materials solidify after being extruded and deposited (e.g., to reduce distortions and curling). In alternative embodiments, build chamber 14 may be omitted and/or replaced with different types of build environments. For example, a 3D part and support structure may be built in a build environment that is open to ambient conditions or may be enclosed with alternative structures (e.g., flexible curtains).

Platen 16 is a platform on which the 3D part and support structure are printed in a layer-by-layer manner, and is supported by platen gantry 18. In some embodiments, platen 16 may also include a flexible polymeric film or liner on which the 3D part and support structure are printed. Platen gantry 18 is a gantry assembly configured to move platen 16 along (or substantially along) the vertical z-axis.

Viscosity pump 20 is an auger-based pump configured to shear and drive successive portions of received particles, and is supported by head gantry 22. Examples of suitable devices for viscosity pump 20 include those disclosed in Batchelder et al., U.S. Pat. Nos. 5,312,224 and 5,764,521; and Skubic et al., U.S. Pat. No. 7,891,964, which are configured to receive particle materials. Head gantry 22 is a gantry assembly configured to move viscosity pump 20 in (or substantially in) a horizontal x-y plane above build chamber 14.

The horizontal x-y plane is a plane defined by an x-axis and a y-axis, where the x-axis, the y-axis, and the z-axis are orthogonal to each other. In an alternative embodiment, viscosity pump 20 may be moved in any suitable spatial motion, including gantry positioning to any coordinate location in the workspace of build chamber 14, and/or pitch-yaw-roll motions. In further alternative embodiments, platen 16 may be configured to move in the horizontal x-y plane within build chamber 14, and viscosity pump 20 may be configured to move along the z-axis. Other similar arrangements may also be used such that one or both of platen 16 and viscosity pump 20 are moveable relative to each other.

As discussed below, system 10 also includes a hopper (not shown in FIG. 1) located above build chamber 14 and operably coupled to viscosity pump 20, and one or more supply containers (not shown in FIG. 1) located adjacent to build chamber 14. The supply container(s) are configured to interface with the hopper via a hopper valve of the present disclosure (not shown in FIG. 1) to fill the hopper to a known volume with part or support material particles.

System 10 also includes controller 24, which is one or more processor-based controllers that may communicate over communication line 26 with universal adapters 18, build chamber 14 (e.g., with a heating unit for build chamber 14), viscosity pump 20, and various sensors, calibration devices, display devices, and/or user input devices. In some embodiments, controller 24 may also communicate with one or more of platen 16, platen gantry 18, head gantry 22, and any other suitable component of system 10.

While illustrated as a single signal line, communication line 26 may include one or more electrical, optical, and/or wireless signal lines, allowing controller 24 to communicate with various components of system 10. Furthermore, while illustrated outside of system 10, controller 24 and communication line 26 are desirably internal components to system 10.

During operation, controller 24 directs platen gantry 18 to move platen 16 to a predetermined height within build chamber 14. Controller 24 then directs head gantry 22 to move viscosity pump 20 around in the horizontal x-y plane above build chamber 14. Controller 24 may also direct viscosity pump 20 to receive the part or support material particles, as discussed below.

Viscosity pump 20 heats and shears the received particles to a sheared state, thereby allowing the particle material to be extruded and deposited onto platen 16 for printing a 3D part or support structure in a layer-by-layer manner. After the print operation is complete, the resulting 3D part or support structure may be removed from build chamber 14, undergo one or more post-processing steps (e.g., support removal).

Figure 2:
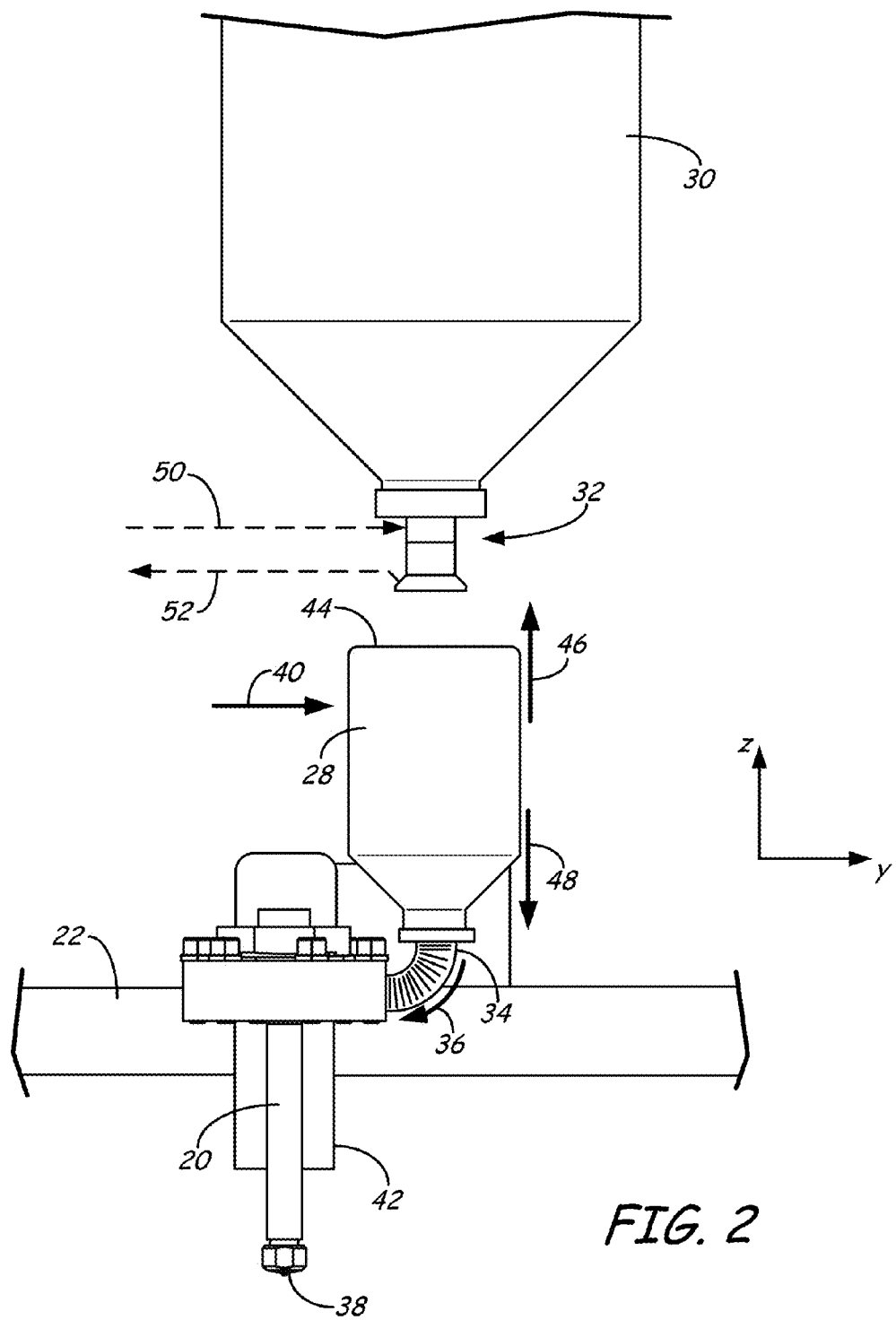
FIG. 2 is a schematic illustration of a sub-assembly of the system for supplying particles of part or support materials to the viscosity pump, where the sub-assembly includes a hopper for the viscosity pump, a supply container, and a hopper valve of the present disclosure retained by the supply container.

FIG. 2 illustrates viscosity pump 20 in use with hopper 28 and supply container 30, where supply container 30 is fitted with hopper valve 32 of the present disclosure. Hopper 28 is an intermediate storage container used to dispense particle materials through conduit 34 to viscosity pump 20, as indicated by arrow 36. In the shown embodiment, hopper 28 is retained by head gantry 22 along with viscosity pump 20. In alternative embodiments, hopper 28 may be retained at a remote location from viscosity pump 20, where conduit 34 is desirably flexible enough to allow viscosity pump 20 to freely move in the horizontal x-y plane. In either embodiment, hopper 28, supply container 30, and conduit 34 are desirably retained outside any heated envelope of build chamber 14 (e.g., above build chamber 14).

Suitable dimensions for hopper 28 and supply container 30 may vary depending on the requirements for system 10. Supply container 30 is desirably larger than hopper 28 to allow hopper 28 to be filled multiple times from supply container 30 (e.g., ten times).

During operation of system 10, controller 24 directs head gantry 22 to move viscosity pump 20 and hopper 28 around in the horizontal x-y plane above platen 18, and directs viscosity pump to draw (or be fed) the particles from hopper 28 (via conduit 34). Viscosity pump 20 then heats, shears, and extrudes the resulting material from extrusion tip 38 as roads to print a 3D part or support structure in a layer-by-layer manner.

At a given point in time, such as when the volume of particles in hopper 28 falls below a threshold quantity or after a printing operation is completed, controller 24 may direct head gantry 22 to align hopper 28 at a location directly below supply container 30 and hopper valve 32, as illustrated by arrow 40. For example, supply container 30 may be stored at a rear location of system 10 above build chamber 14. In additional and/or alternative embodiments, supply container 30 may also be moveable in the horizontal x-y plane to allow hopper 28 to be positioned below supply container 30.

In the shown embodiment, viscosity pump 20 and hopper 28 are retained by head gantry 22 with actuator carriage 42, which is a mechanism (e.g., a servo actuator) configured to raise and lower viscosity pump 20 and hopper 28 along the vertical z-axis by a small range of movement. As such, controller 24 may direct actuator carriage 42 to raise viscosity pump 20 and hopper 28 along the vertical z-axis to engage top wall 44 of hopper 28 with hopper valve 32, as illustrated by arrow 46. In additional and/or alternative embodiments, supply container 30 may also be moveable along the vertical z-axis to engage hopper valve 32 with hopper 28.

As discussed below, hopper 28 engages with hopper valve 32 to dispense the particles from supply container 30 to hopper 28 under gravity. This fills hopper 28 to a known fill volume. After hopper 28 is filled, such as after a predetermined duration, controller 24 may then direct actuator carriage 42 to lower viscosity pump 20 and hopper 28 downward along the vertical z-axis, as illustrated by arrow 48. This disengages hopper valve 32 from hopper 28 in a manner that prevents residual amounts of the particles from contaminating the working environment. In other words, the engagements and disengagements between hopper 28 and hopper valve 32 are clean. As discussed below, this may be accomplished with the assistance of scour air line 50 and vacuum line 52.

Figure 3A:
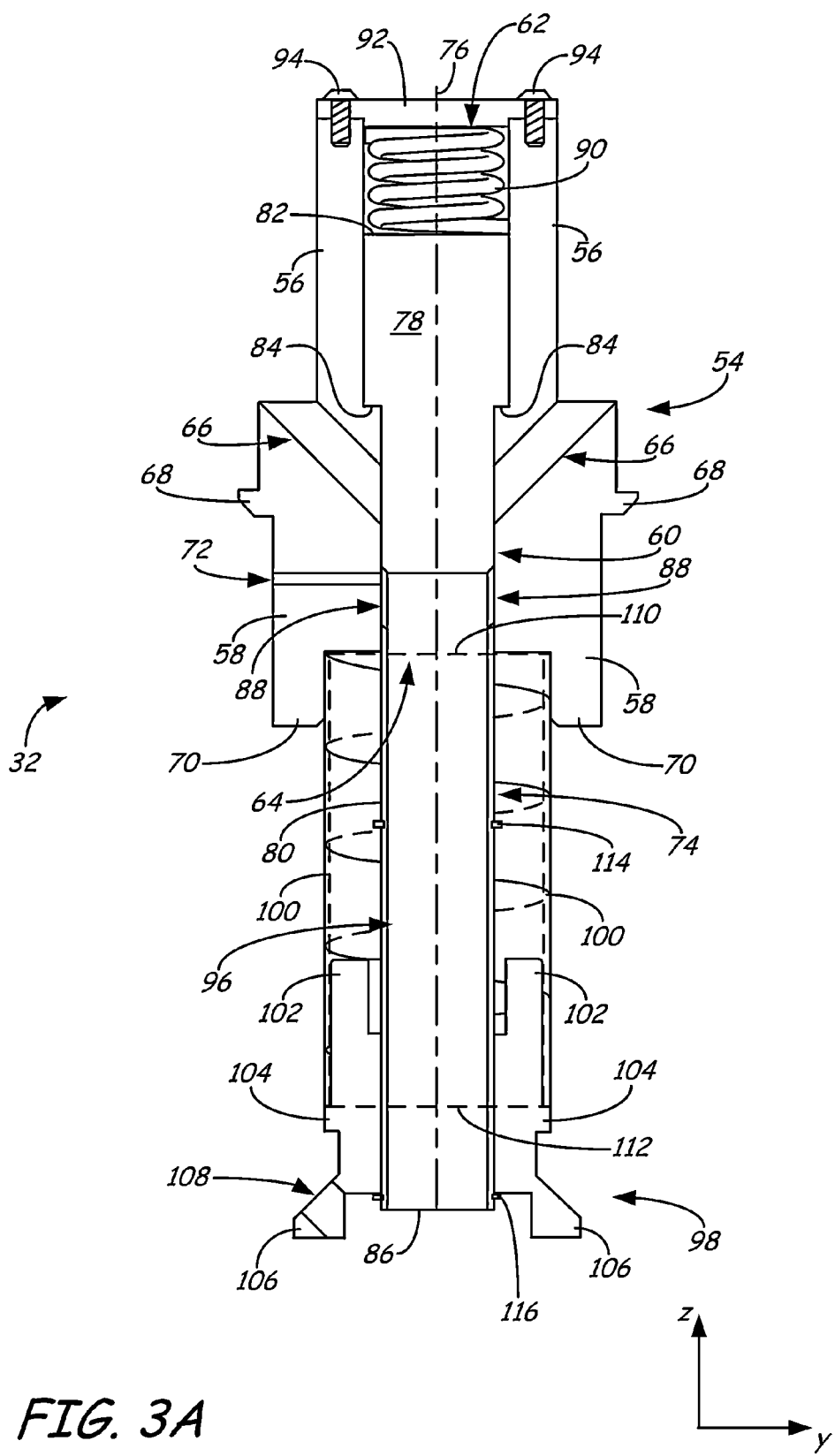
FIG. 3A is a sectional illustration of an example embodiment of the hopper valve.
Figure 3B:
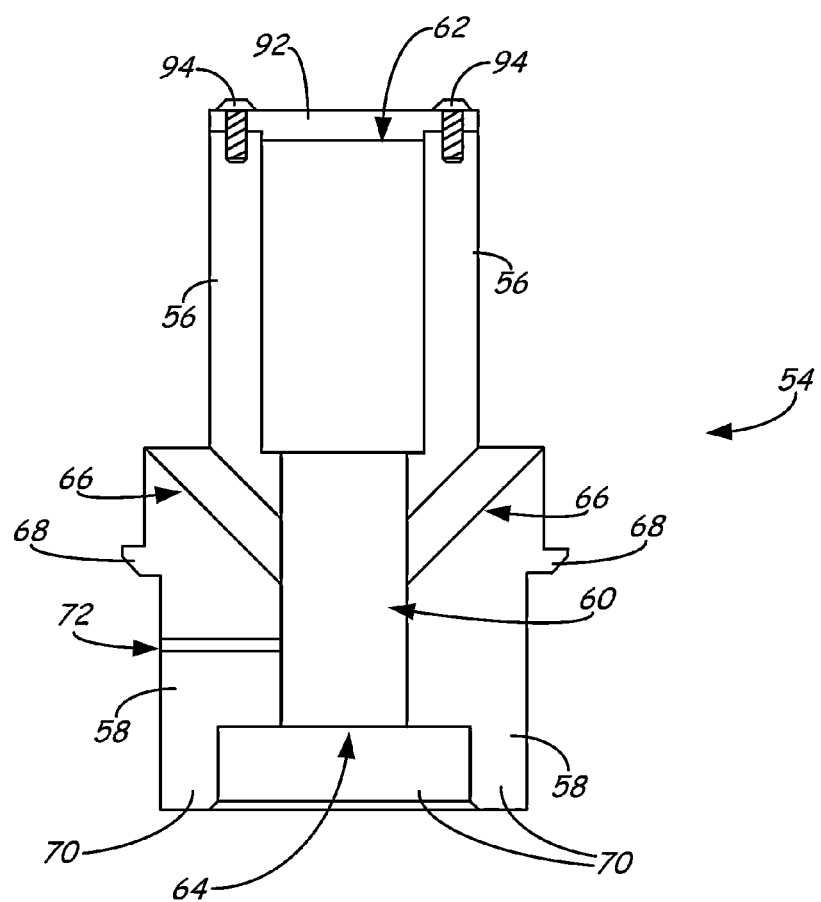
FIG. 3B is a sectional illustration of a valve body of the hopper valve.

FIG. 3A illustrates an example embodiment of hopper valve 32. As shown, hopper valve 32 includes valve body 54 (also shown in FIG. 3B), which has upper portion 56 integrally formed with lower portion 58 from one or more polymeric and/or metallic materials. Upper portion 56 and lower portion 58 of valve body 54 collectively define central channel 60, which itself has top opening 62 and bottom opening 64. Lower portion 58 also defines one or more fill ports 66 (two opposing fill ports 66 are shown in FIGS. 3A and 3B), which are sloped ports having inlet openings at the external side of valve body 54 and outlet openings at central channel 60.

Lower portion 58 further defines retention rib 68 extending around the outer perimeter of lower portion 58. Retention rib 68 is suitable for retaining hopper valve 32 to supply container 30, as discussed below. Lower portion 58 also includes annular rim 70 at bottom opening 64 of central channel 60, and scour air port 72 extending laterally between the external side of valve body 54 and central channel 60. Scour air port 72 is the portion of hopper valve 32 that engages with scour air line 50 (shown in FIG. 2) for receiving scour air.

Figure 3C:
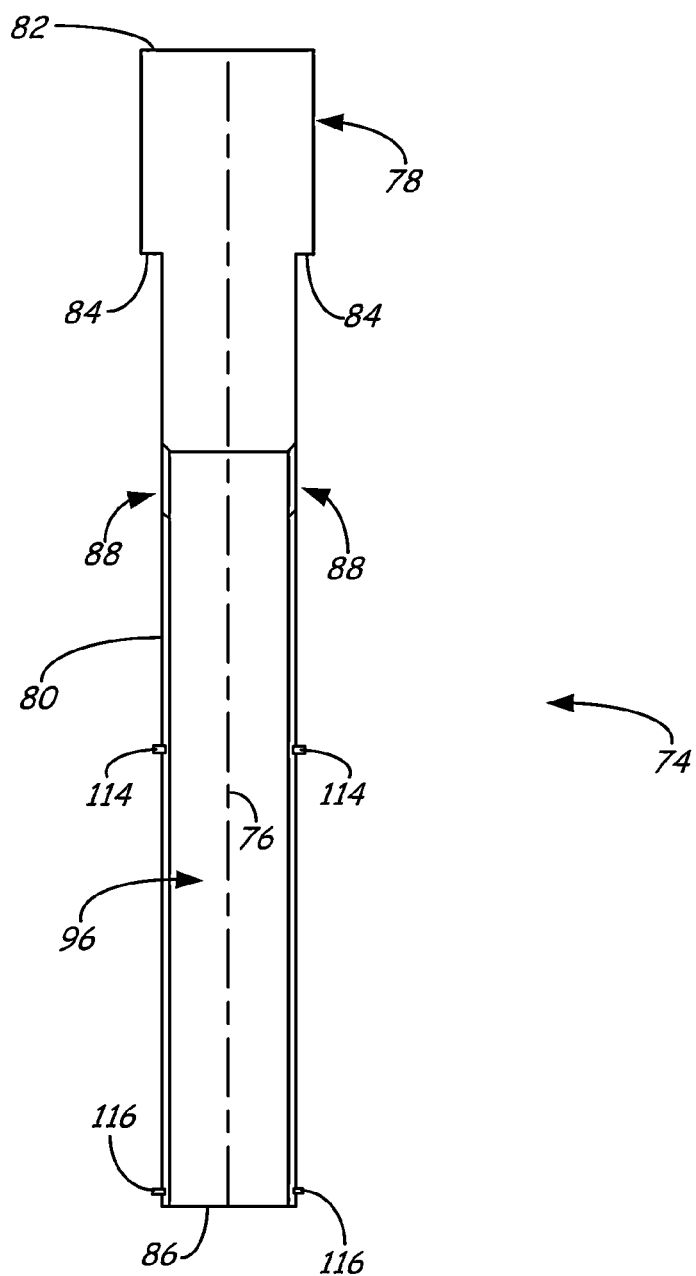
FIG. 3C is a sectional illustration of a fill tube of the hopper valve.

Hopper valve 32 also includes fill tube 74 (also shown in FIG. 3C) extending through central channel 60 (i.e., along longitudinal axis 76). Fill tube 74 includes head component 78 integrally formed with tube component 80 from one or more polymeric and/or metallic materials (e.g., aluminum). Head component 78 has a top end with top surface 82 disposed within upper portion 56 of valve body 54, and includes bearing shoulders 84 that press against reciprocating shoulders of valve body 54 to prevent fill tube 74 from falling downward through central shaft 60.

Tube component 80 has a top end at head component 78, within lower portion 58 of valve body 54, and extends downward along longitudinal axis 76 through bottom opening 64 of central channel 60. As such, the bottom end of tube component 80 (referred to as bottom end 86) is disposed at an offset location downward from valve body 54. Tube component 80 also includes lateral slots 88 that are configured to align with fill ports 66 during use in an open state, as discussed below.

Figure 3D:
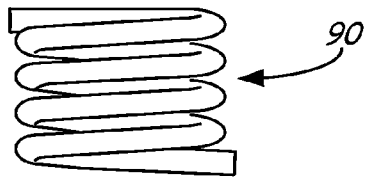
FIG. 3D is an illustration of a spring of the hopper valve that engages between the valve body and the fill tube.

At upper portion 56 of valve body 54, hopper valve 32 also includes spring 90 (also shown in FIG. 3D) or other suitable biasing component that is disposed within central channel 60 between top surface 82 of head component 78 and a cap of valve body 54 (referred to as cap 92, secured to valve body with screws 94 or other similar fasteners). Thus, spring 90 biases fill tube 74 downward such that bearing shoulders 84 are pressed and retained against the reciprocating shoulders of valve body 54, as shown in FIG. 3A. In this closed state, scour air port 72 is aligned with one of slots 88 to allow scour air to flow from scour air line 50 (shown in FIG. 2) into the inner conduit of tube component 80 (referred to as inner conduit 96), as discussed below.

In alternative embodiments, hopper valve 32 may include different forms of biasing components in lieu of spring 90. For example, hopper valve may include a pressurized air line to adjust the air pressure within the region between head component 78 and cap 92 in a piston-like manner.

Figure 3E:
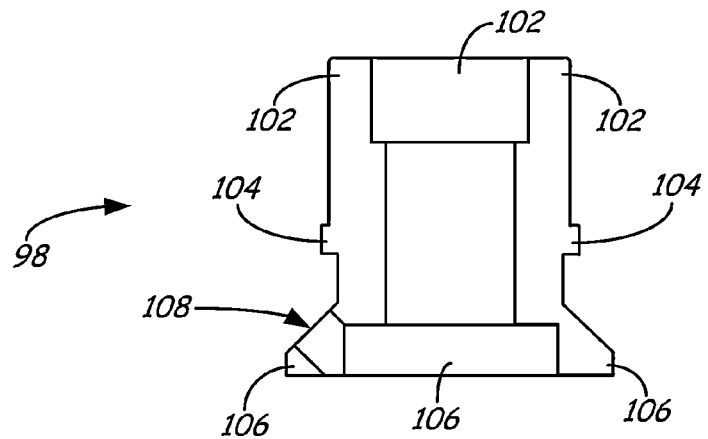
FIG. 3E is a sectional illustration of a foot member of the hopper valve.
Figure 3F:
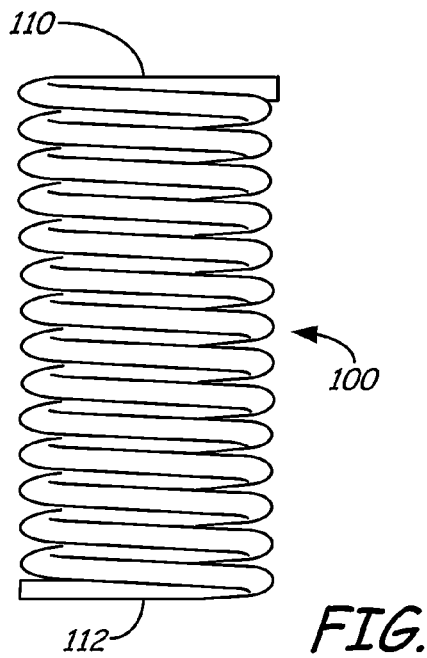
FIG. 3F is an illustration of a hold-down spring of the hopper valve that engages between the valve body and the foot member.

Hopper valve 32 further includes foot member 98 (also shown in FIG. 3E) and hold-down spring 100 (also shown in FIG. 3F). Foot member 98 is the component of hopper valve 32 that contacts top wall 44 of hopper 28 (shown in FIG. 2), and may also be fabricated from one or more polymeric and/or metallic materials. Foot member 98 includes upper rim 102, base ring 104, base rim 106, and vacuum port 108, where vacuum port 108 is illustrated as extending through a portion of base rim 106.

Hold-down spring 100 is a spring or other biasing component having a first end 110 and a second end 112. First end 110 is retained against lower portion 58 of valve body 54, within annular rim 70 of lower portion 58. Second end 112 is retained against the upward-facing surface of base ring 104. As such, hold-down spring 100 extends around tube component 80 (below lower portion 58 of valve body 54) and upper rim 102 of foot member 98, thereby biasing foot member 98 away from valve body 54.

In the shown embodiment, hopper valve 32 also includes top snap ring 114 and bottom snap ring 116 (also shown in FIG. 3C), which function as hard stops to limit relative movements between valve body 54, fill tube 74, and foot member 98. In particular, top snap ring 114 is secured in a mid-length groove of tube component 80 to provide a hard stop for fill tube 74 relative to foot member 98, where top snap ring 114 engages foot member 98 within the slot defined by upper rim 102. Correspondingly, bottom snap ring 116 is secured in a second groove in tube component 80 at bottom end 86 to prevent foot member 98 from sliding off of fill tube 98 under the biasing pressure of hold-down spring 100.

Thus, the distance between top snap ring 114 and bottom snap ring 116 define a range of movement of fill tube 74 relative to foot member 98. As can be appreciated, in the shown embodiment, fill tube 74 is slidably (or otherwise moveably) coupled to valve body 54 (within central channel 60) and is separately slidably (or otherwise moveably) coupled to foot member 98. Foot member 98 is offset from valve body 54, and is retained relative to valve body 54 by hold-down spring 100 and the engagement with fill tube 74.

FIGS. 4A-4I illustrate the operation hopper valve 32 for transferring particles of part or support materials (referred to as particles 118) from supply container 30 to hopper 28. Particles 118 may compositionally include any suitable thermoplastic material for printing a 3D part or support structure with viscosity pump 20. Furthermore, the particle dimensions and size distributions desirably allow particles 118 to flow under gravity, and to be suitable for use with viscosity pump 20

Examples of suitable materials for particles 118 include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Additional examples of suitable materials for particles 118 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Batchelder, U.S. Patent Application Publication No. 2009/0263582; and Hopkins et al., U.S. Patent Application Publication No. 2010/0096072. Particles 118 may also include additional additives, such as plasticizers, rheology modifiers, inert fillers, colorants, stabilizers, and combinations thereof.

Figure 4A:
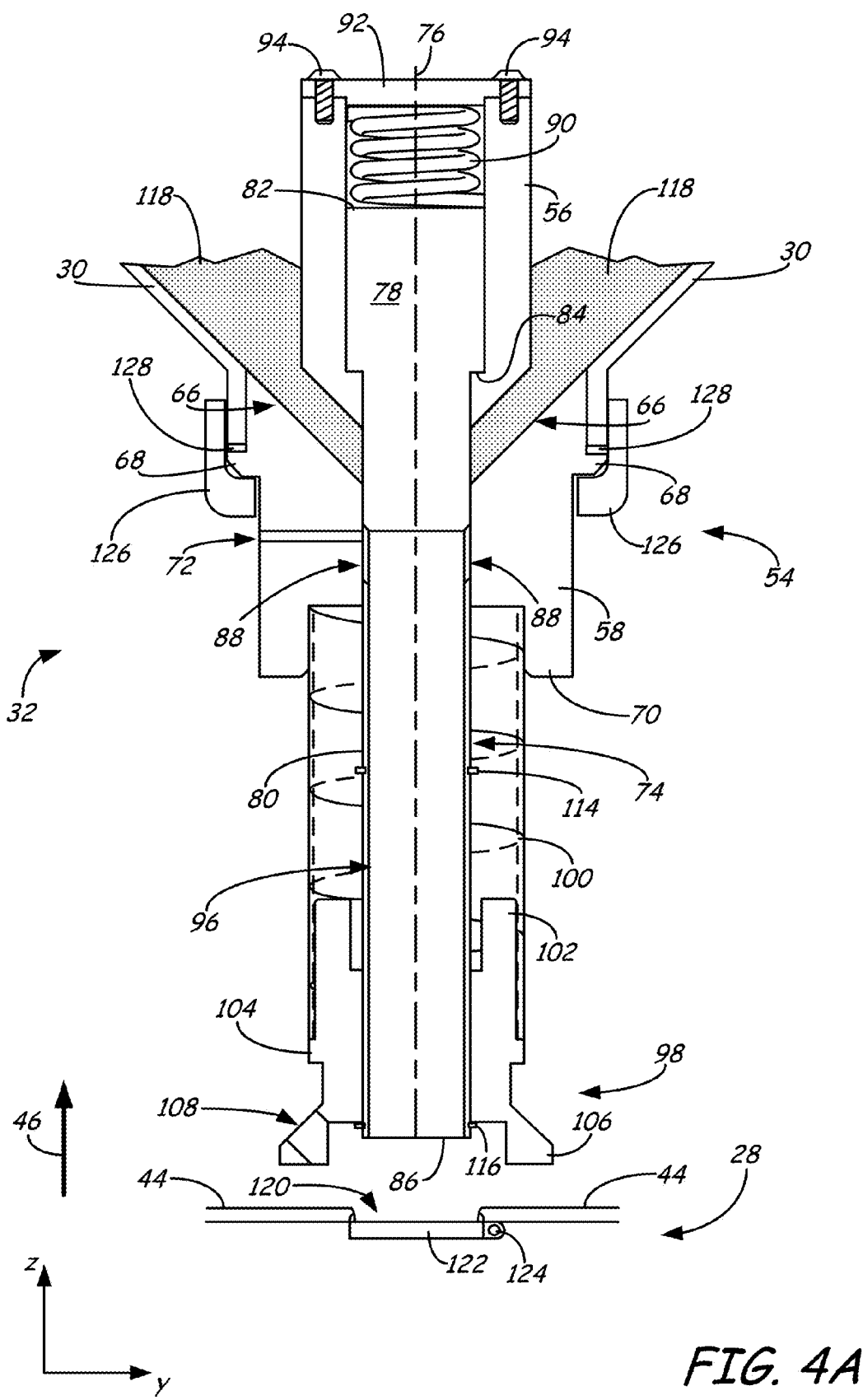

As shown in FIG. 4A, top wall 44 of hopper 28 includes inlet port 120, which is closed off via hatch 122. Hatch 122 is hingedly coupled to top wall 44 with hinge 124, where hinge 124 biases hatch 122 to its closed state, as shown in FIG. 4A. This seals top wall 44 of hopper 28 to prevent any particle materials within hopper 28 from escaping hopper 28 while head gantry 22 moves hopper 28 (and viscosity pump 20) in the horizontal x-y plane.

Hopper valve 32 is secured to supply container 30 with cap 126 and gasket ring 128, where hopper valve 32 extends through cap 126 and gasket ring 128. In particular, retention rib 68 and gasket ring 128 are tightly pressed between the dispenser head of supply container 30 and cap 126, such as when cap 126 is screwed on or otherwise coupled to supply container 30. Gasket ring 128 is a seal that provides a moisture and particle barrier at the contact location between supply container 30, retention rib 68, and cap 126.

In one embodiment, hopper valve 32 is reusable with successive supply containers 30. For example, after a given supply container 30 is empty, cap 126 and hopper valve 32 may be removed, and installed onto a new, full supply container 30. This new supply container 30 may then be loaded to system 10 at a specified location for subsequent use.

As discussed above, at a given point in time, controller 24 (shown in FIG. 1) may direct head gantry 22 (shown in FIG. 2) to position hopper 28 below supply container 30 and hopper valve 32. As shown in FIG. 4A, this positions inlet port 120 of hopper 28 below bottom end 86 of fill tube 74. Controller 24 may then direct actuator carriage 42 (shown in FIG. 2) to raise hopper 28 along the vertical z-axis, as illustrated by arrow 46.

Figure 4B:
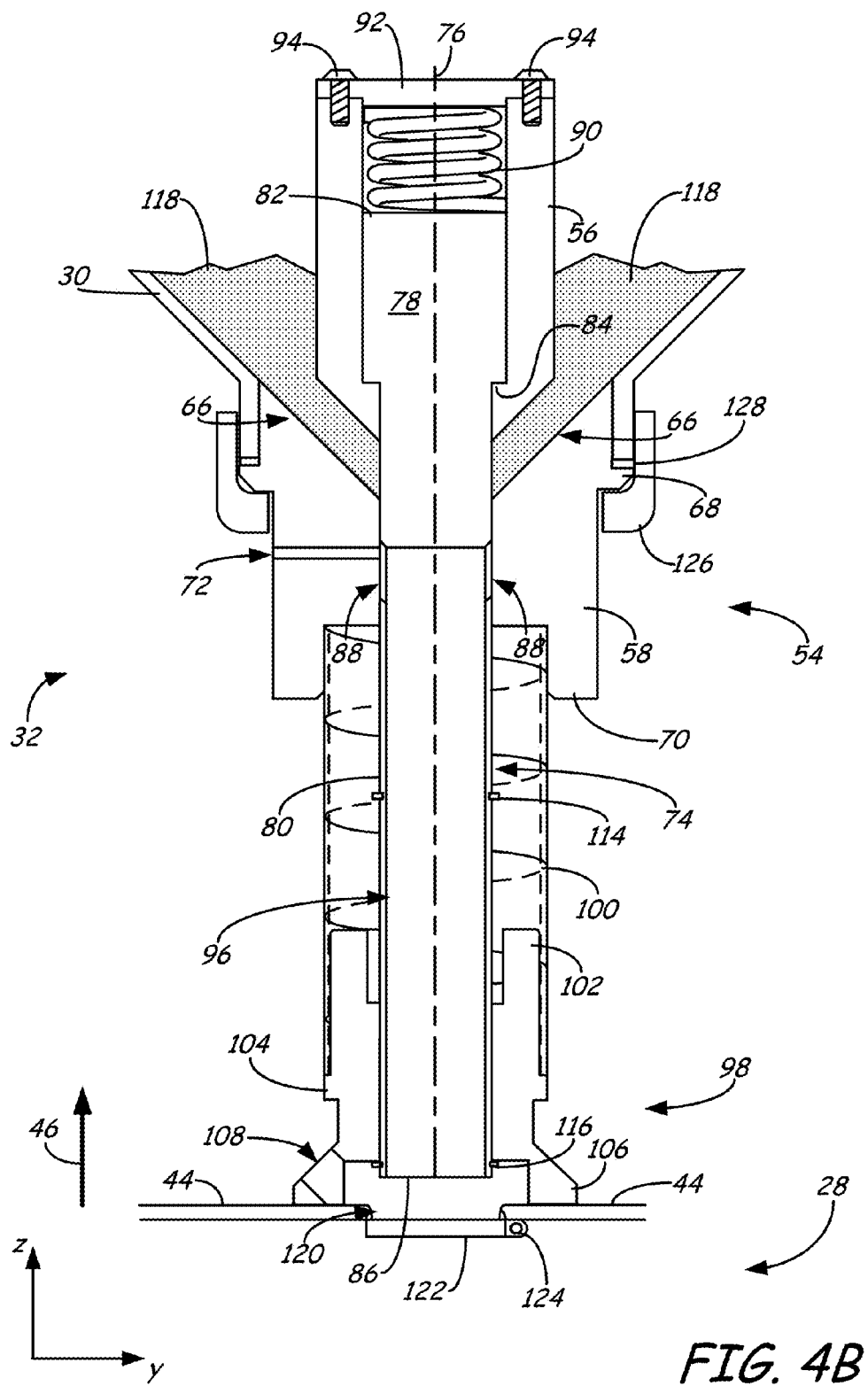

As shown in FIG. 4B, this engages top wall 44 of hopper 28 with base rim 106 of foot member 98. This engagement provides an enclosed space within base rim 106, between inlet port 120 and foot member 98, prior to opening hatch 122. This reduces the risk of particles 118 escaping at the engagement between hopper 28 and hopper valve 32 during the transfer.

Figure 4C:
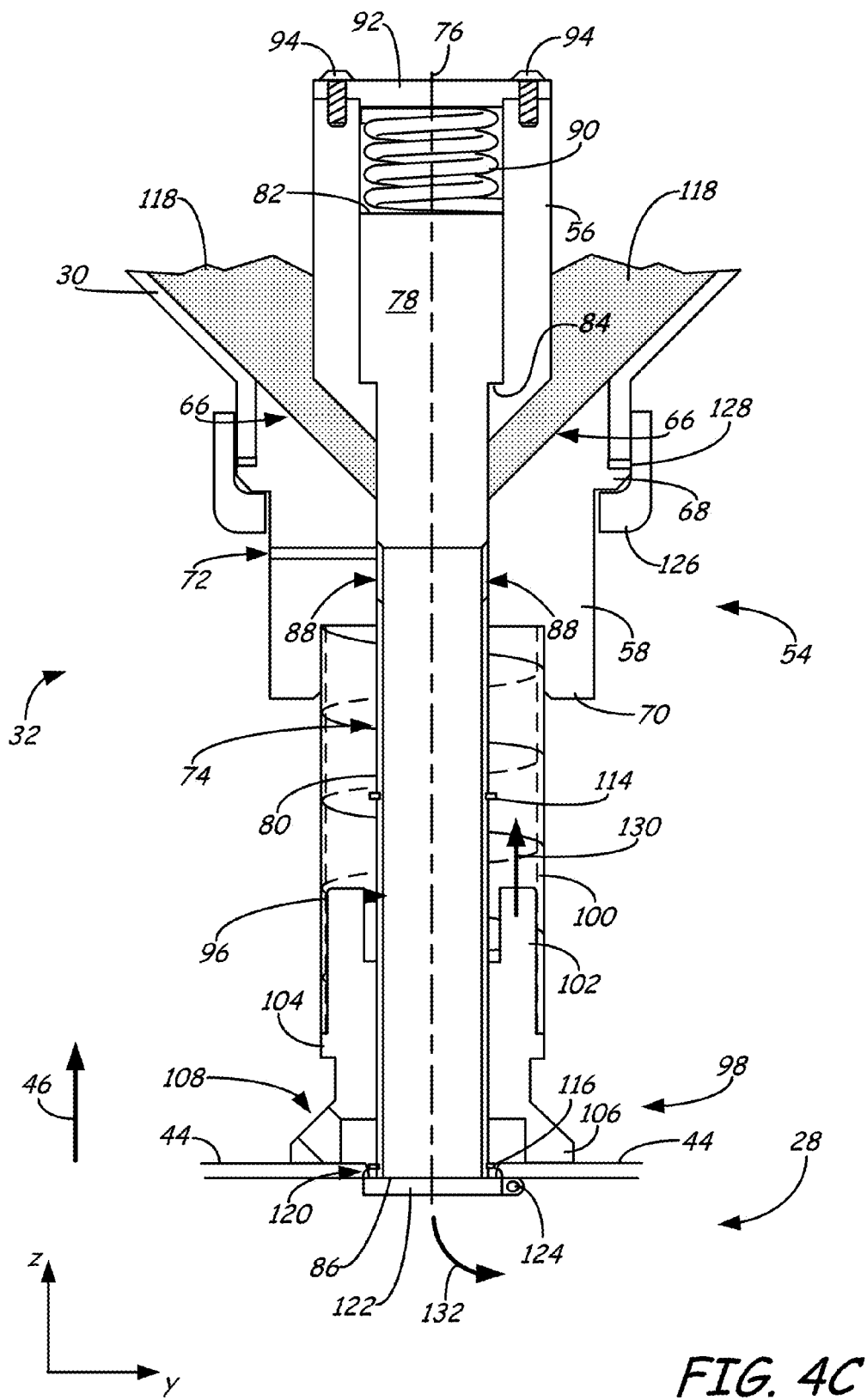

As shown in FIG. 4C, as hopper 28 continues to rise along the vertical z-axis in the direction of arrow 46, the upward movement presses foot member 98 upward against the bias of hold-down spring 100, as illustrated by arrow 130. This compresses hold-down spring 100 and disengages foot member 98 from bottom snap ring 116. As foot member 98 continues to press upward, bottom end 86 of fill tube 74 contacts hatch 122. Subsequently, the continued upward movement of hopper 28 causes bottom end 86 of fill tube 74 to push through hatch 122, against the bias of hinge 124. This pivots hatch 122 around hinge 124, as illustrated by arrow 132, to open hatch 122.

Figure 4D:
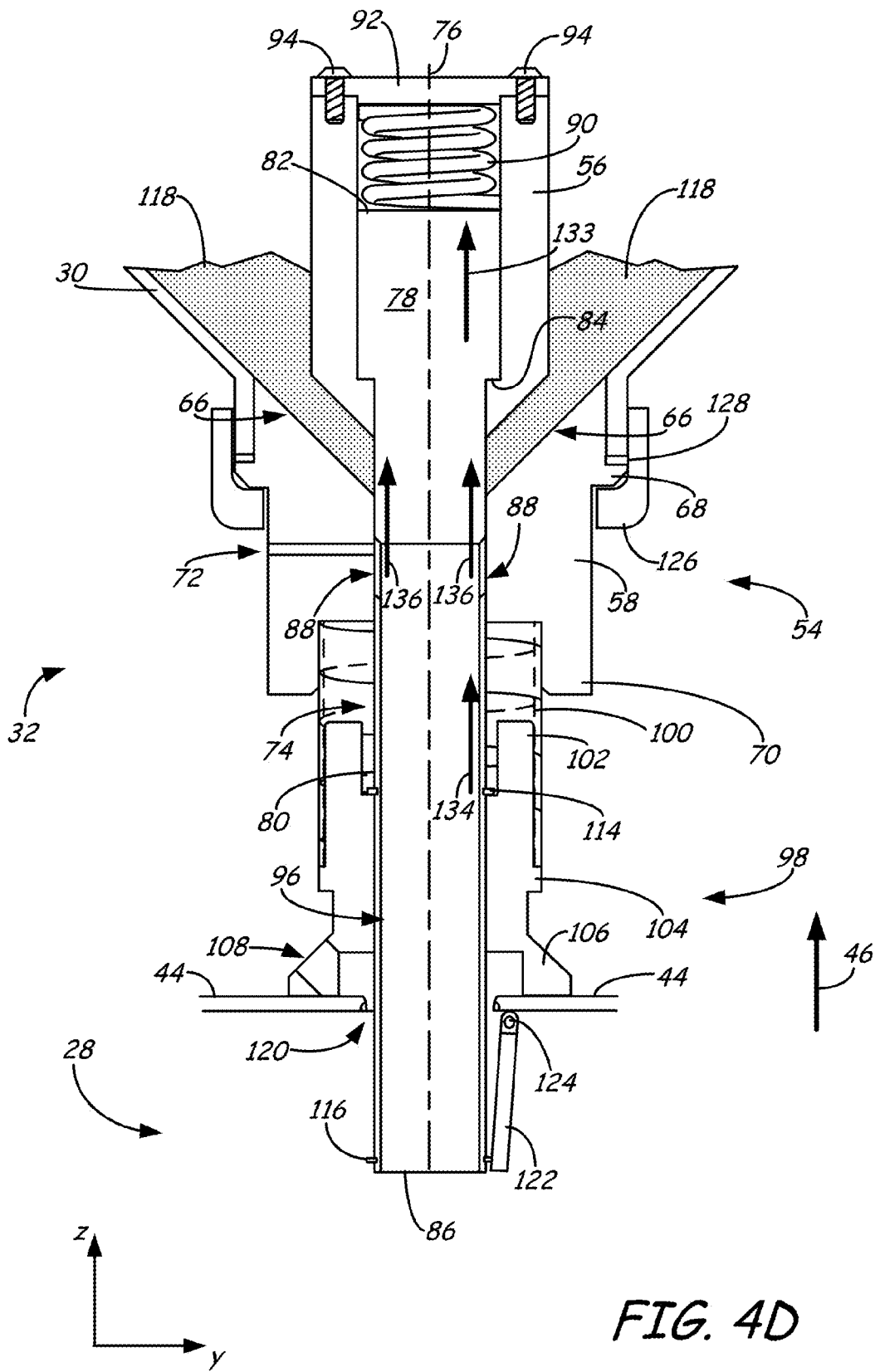

As shown in FIG. 4D, as foot member 98 continues to press further upward, bottom end 86 of fill tube 74 inserts through inlet port 120 and into the interior region of hopper 28. Fill tube 74 may continue to insert into hopper 28 until the slot in upper rim 102 of foot member 98 contacts top snap ring 114, as shown in FIG. 4D.

At this point, the continued upward movement of hopper 28 presses foot member 98 against top snap ring 114, which presses fill tube 74 upward against the bias of spring 90 (as illustrated by arrow 133), and against the bias of hold-down spring 100 (as illustrated by arrow 134). As can be appreciated, the engagement between foot member 98 and top snap ring 114 prevents fill tube 74 from inserting further into hopper 28, and directs further applied pressure against spring 90 and hold-down spring 100.

The upward movement of fill tube 74 relative to valve body 54 accordingly moves slots 88 upward, as illustrated by arrows 136, to disengage from scour air port 72, and to align with fill ports 66 within supply container 30. This switches fill tube 74 from a closed state to an open state. Hopper 28 may continue to move upward until upper rim 102 of foot member 98 contacts bottom portion 58 of valve body 54, within annular rim 70 (i.e., fully compressing hold-down spring 100), and top surface 82 of valve block 56 fully compresses spring 90 against cap 92. This places hopper valve 32 in a fully engaged state with hopper 28, where fill tube 74 is in its open state.

Figure 4E:
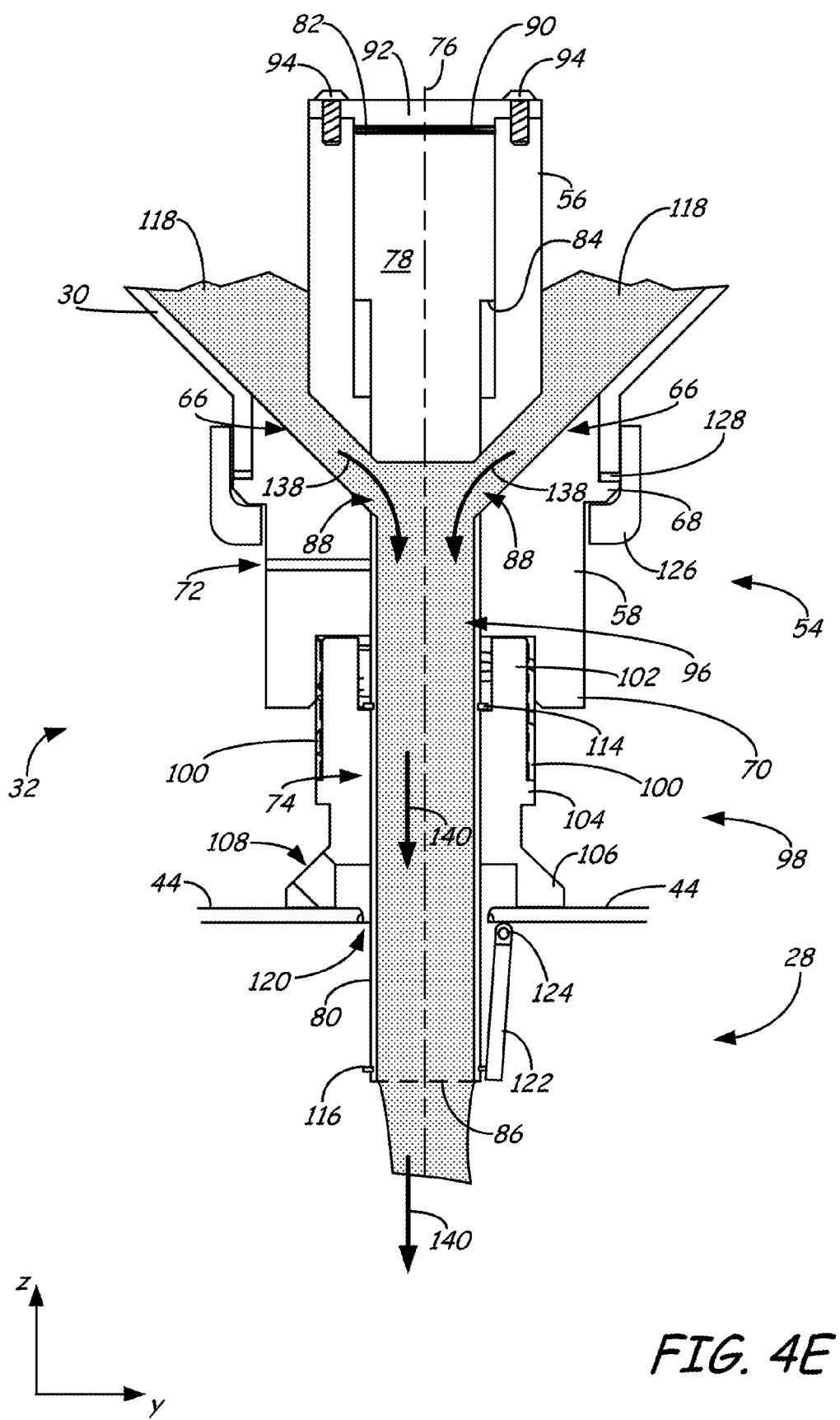

FIG. 4E shows hopper valve 32 in the fully engaged state for transferring particles 118 from supply container 30 to hopper 28. As shown, spring 90 is substantially or fully compressed such that slots 88 are aligned with fill ports 66 (i.e., fill tube 74 is in its open state). This allows particles 118 to flow under gravity from supply container 30, through fill ports 66 and slots 88, and into inner conduit 96 of fill tube 74, as illustrated by arrows 138. The flow of particles 118 then falls downward through inner conduit 96 of fill tube 74 and into hopper 28 under gravity, as illustrated by arrows 140.

As can be appreciated, the biases of spring 90 and hold-down spring 100 maintain a tight seal between hopper valve 32 and top wall 44 of hopper 28. This prevents particles 118 from escaping during the transfer.

Figure 4F:
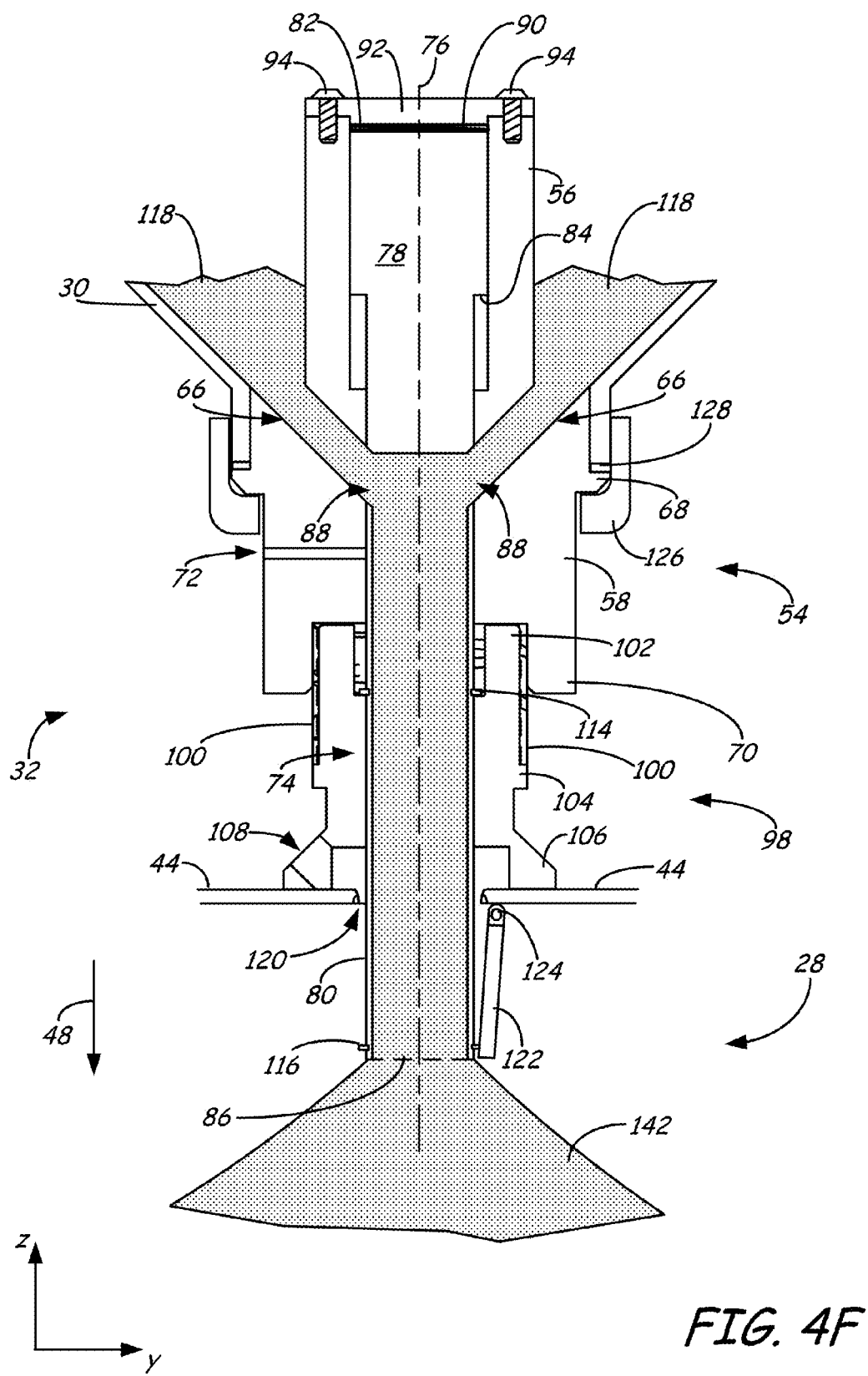

As shown in FIG. 4F, the transfer of particles 118 may continue until hopper 28 is filled up to bottom end 86 of fill tube 74, which provides particle mound 142 in hopper 28. The back pressure generated by particle mound 142 prevents further portions of particles 118 from flowing into hopper 28. After a predetermined duration that is suitable for transferring the volume of particles 118 from supply container 30 to hopper 28, controller 24 may direct actuator carriage 42 to lower hopper 28 along the vertical z-axis, as illustrated by arrow 48.

Figure 4G:
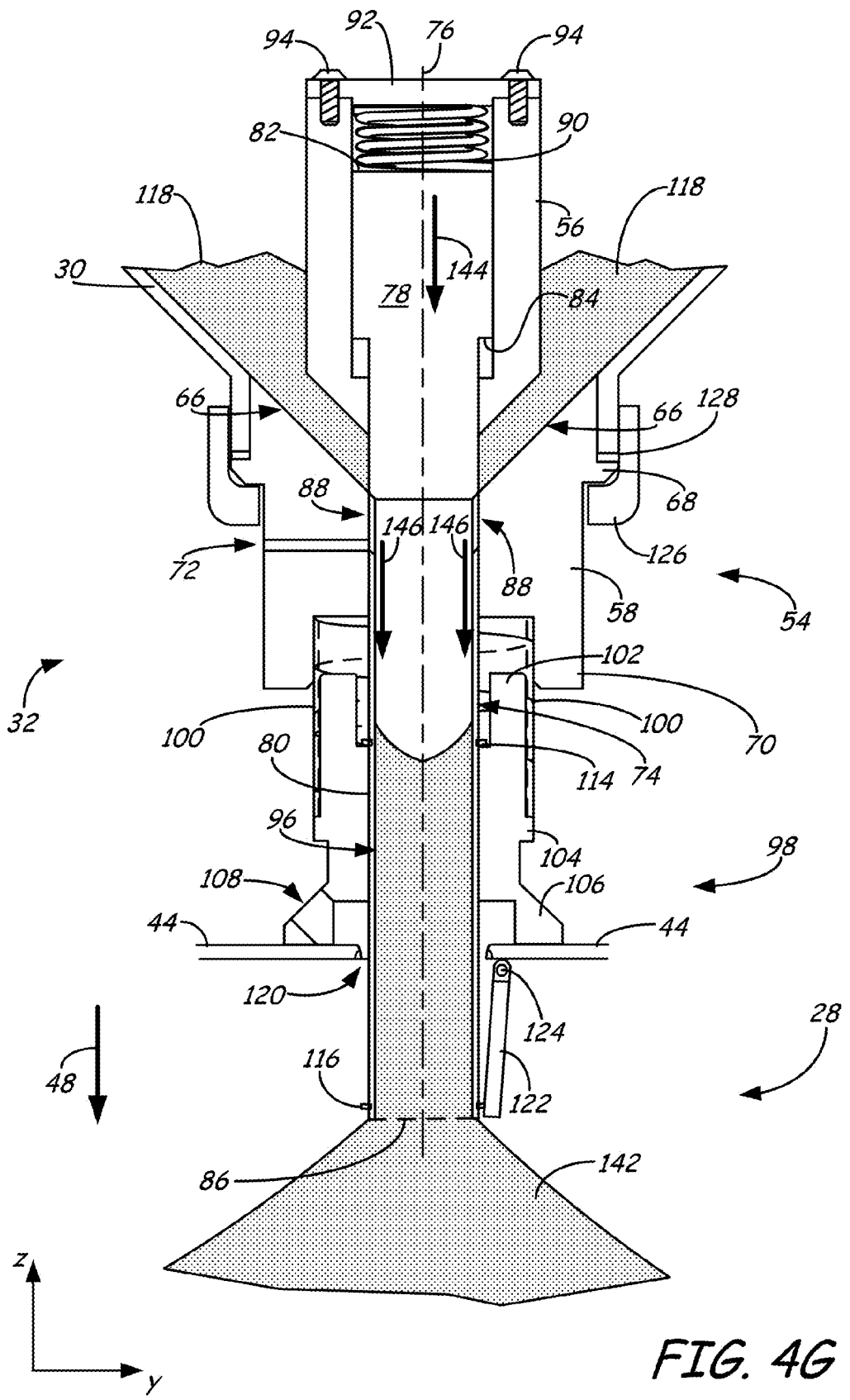

As shown in FIG. 4G, this relieves the pressure applied to spring 90 and hold-down spring 100, allowing them to expand. The expansion of spring 90 presses fill tube 74 downward relative to valve body 54, as illustrated by arrow 144. This accordingly, lowers slots 88 downward from fill ports 66 to scour air port 72 (as illustrated by arrows 146), preventing further amounts of particles 118 from flowing from supply container 30 into inner conduit 96 of fill tube 74. Thus, fill tube 74 is switched back from its open state to its closed state. The expansion of hold-down spring 100 correspondingly presses foot member 98 downward relative to valve body 54 and fill tube 74, thereby raising fill tube 74. The remaining volume of particles 118 in inner conduit 96 continues to fall into hopper 28 as fill tube 74 is raised. This may continue until bottom end 86 of fill tube 74 exits inlet port 120 of hopper 28, and while foot member 98 remains engaged with top wall 44.

Figure 4H:
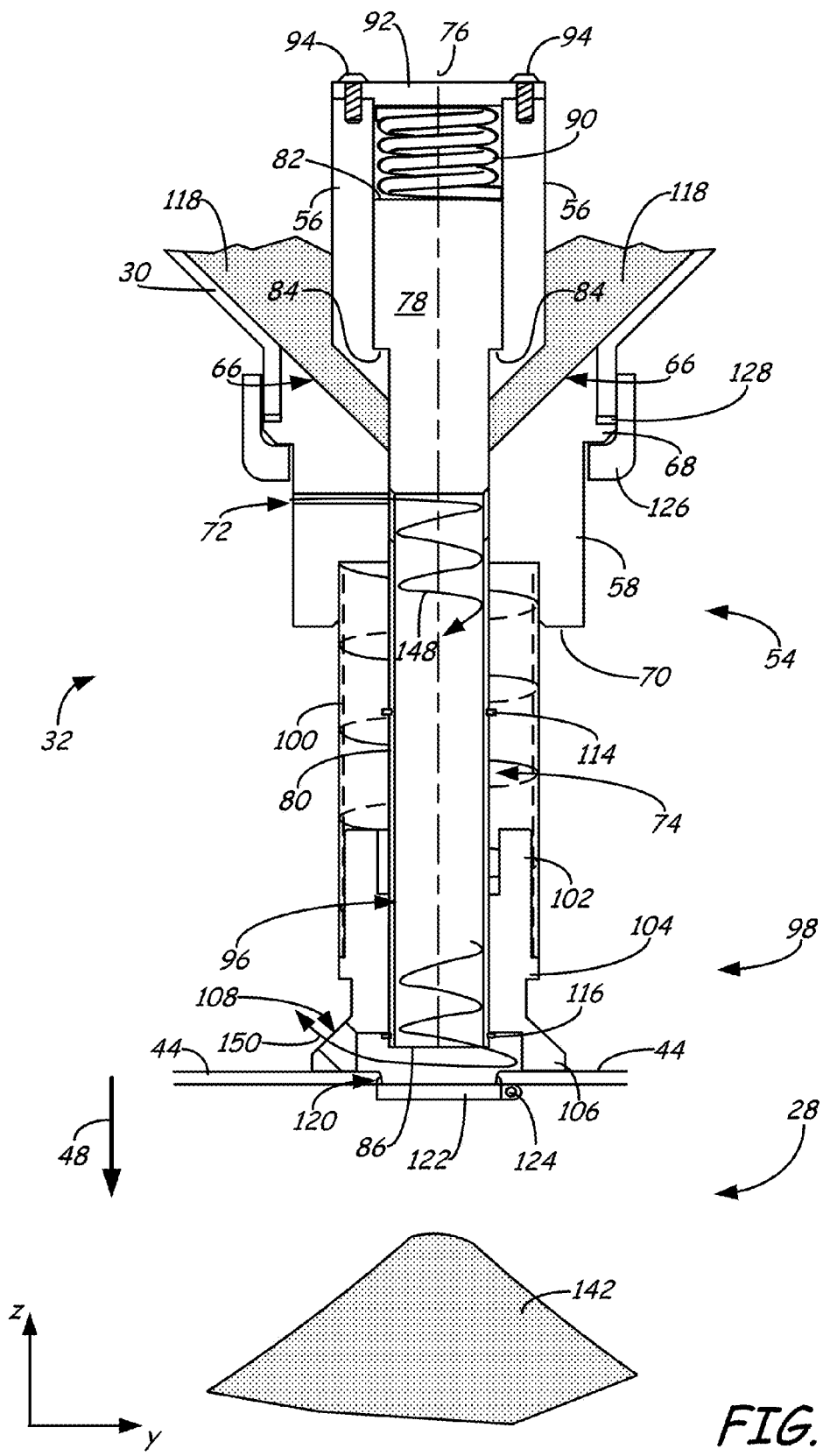

As shown in FIG. 4H, at this point, controller 24 may direct pressurized scour air to flow through scour air line 50 (shown in FIG. 2) and scour air port 72, into inner conduit 96, as illustrated by arrow 148. At the same time, controller 24 may direct a vacuum to be drawn through vacuum line 52 (shown in FIG. 2), which draws the scour air, and any residual particles 118 through vacuum port 108, as illustrated by arrow 150.

Figure 4I:
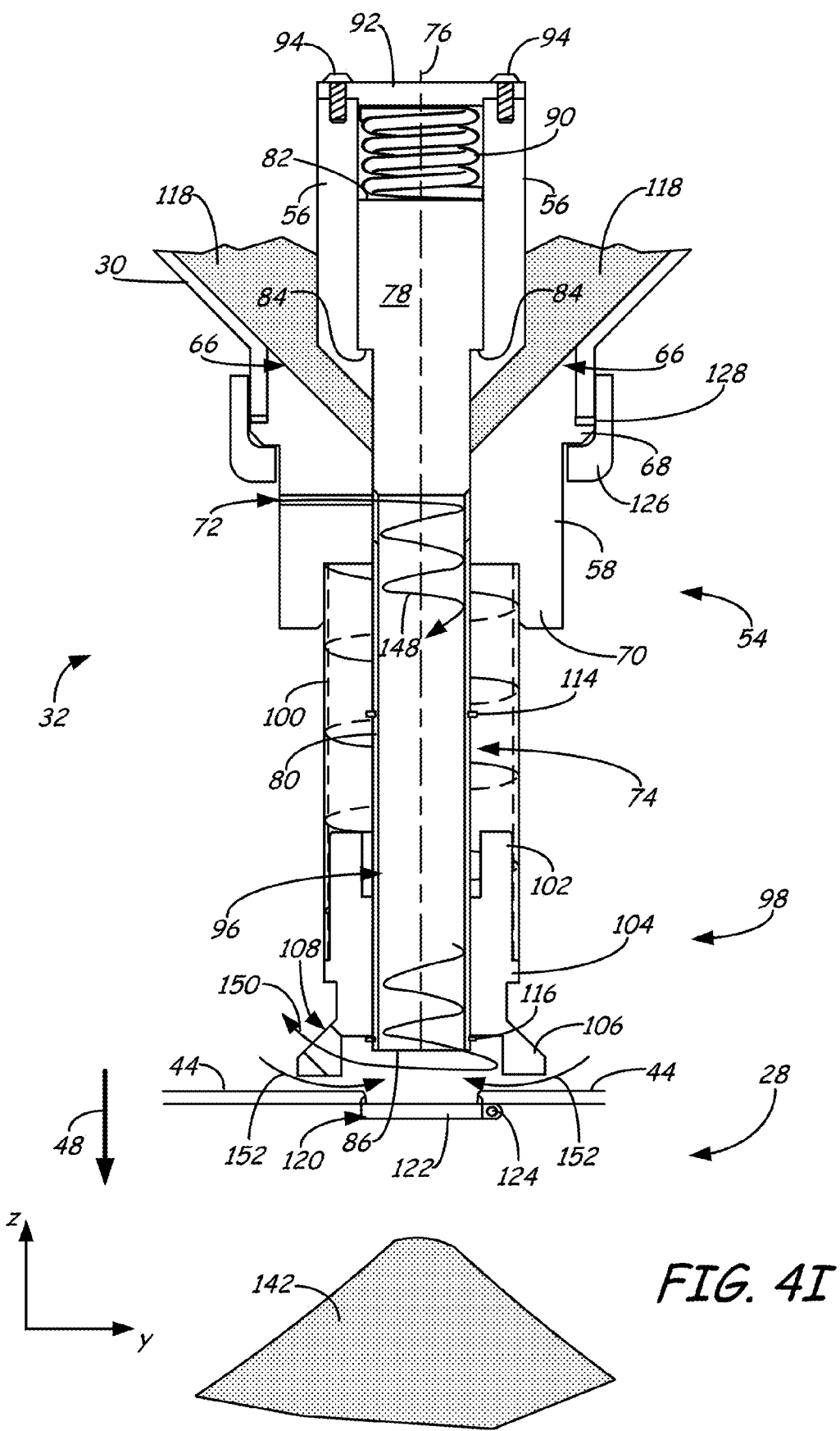

As shown in FIG. 4I, as hopper 28 continues to lower, foot member 98 eventually disengages from top wall 44. Controller 24 desirably maintains the scour air and vacuum drawing as foot member 98 disengages, which draws air from the vicinity of hopper 28 through vacuum port 108, as illustrated by arrows 152. This further prevents any residual particles 118 from being blown away, providing a clean engagement and disengagement between hopper 28 and hopper valve 32.

As discussed above, hopper valve 32 transfers particles 118 until particle mound 142 reaches bottom end 86 of fill tube 74. This allows hopper 28 to be repeatedly filled to the substantially the same fill level regardless of the amount of particles 118 already residing in hopper 28. As such, hopper 28 may be consistently filled to a known state before subsequent printing operations with viscosity pump 20.

FIG. 5 illustrates an alternative embodiment, in which hopper 28 may interface with multiple hopper valves (e.g., hopper valves 32a-32d) for transferring particles of part or support materials from multiple supply containers (e.g., supply containers 30a-30d).

Although the present disclosure has been described with reference to preferred embodiments, workers skilled in the art will recognize that changes may be made in form and detail without departing from the spirit and scope of the disclosure.

The invention claimed is:

1. A hopper valve for transferring particles from a supply container to a hopper, the hopper valve comprising:
    a valve body configured to couple to the supply container and having at least one fill port;
    a fill tube moveably coupled to the valve body and having at least one slot;
    a first biasing component configured to bias the fill tube in a first direction relative to the valve body, wherein the at least one slot is configured to align with the at least one fill port when the fill tube is moved against the bias of the first biasing component;
    a foot member moveably coupled to the fill tube and configured to engage the hopper; and
    a second biasing component configured to bias the foot member in the first direction relative to the valve body.

2. The hopper valve of claim 1, wherein the fill tube comprises:
    a head component moveably retained within a central channel of the valve body; and
    a tube component extending from the head component, and further comprising:
        an outlet end opposite of the head component; and
        an inner conduit extending between the head component an outlet end, wherein the at least one slot extends through the tube component to the inner conduit.

3. The hopper valve of claim 2, wherein the head component of the fill tube and the valve body comprise reciprocating shoulders to moveably retain the head component in the central channel of the valve body.

4. The hopper valve of claim 2, wherein the fill tube further comprises:
    a first hard stop retained adjacent to the outlet end; and
    a second hard stop retained between the head component and the outlet end, wherein the first hard stop and the second hard stop define a range of movement for the foot member relative to the fill tube.

5. The hopper valve of claim 1, wherein the valve body further comprises a scour air port configured to align the at least one slot when the fill tube is not moved against the bias.

6. The hopper valve of claim 1, wherein the first biasing component and the second biasing component each comprise a spring.

7. The hopper valve of claim 1, wherein the foot member comprises:
    an annular base rim; and
    a port extending through the annular base rim, the port being configured to connect to a vacuum line.

8. A method for transferring particles from a supply container to a hopper, the method comprising:
    providing a hopper valve having a valve body retained by the supply container, a fill tube in a closed state, and a foot member;
    biasing the fill tube in a downward direction relative to the valve body;
    biasing the foot member apart from the valve body;
    engaging a top wall of the hopper with the foot member;
    moving the fill tube downward relative to the engaged foot member to insert a portion of the fill tube through a port in the top wall of the hopper;
    moving the inserted fill tube upward relative to the valve body to switch the inserted fill tube from the closed state to an open state; and
    directing the particles from the supply container, through the inserted fill tube in the open state, and into the hopper.

9. The method of claim 8, wherein the hopper is operably connected to an auger-based pump that is configured to print a three-dimensional part from the particles.

10. The method of claim 8, wherein switching the inserted fill tube from the closed state to the open state comprises aligning a slot of the fill tube with a fill port of the valve body.

11. The method of claim 8, wherein engaging the top wall of the hopper with the foot member forms an enclosed region between the foot member and the top wall of the hopper above the port in the top wall of the hopper.

12. The method of claim 8, and further comprising:
    moving the inserted fill tube downward relative to the valve body to switch the inserted fill tube from the open state to the closed state;
    moving the inserted fill tube upward relative to the engaged foot member to remove the fill tube from the port in the top wall of the hopper; and
    disengaging the top wall of the hopper from the foot member.

13. The method of claim 12, and further comprising:
    directing scour air into the fill tube when the fill tube is switched to the closed state; and
    drawing a vacuum through an opening in the foot member prior to disengaging the top wall of the hopper from the foot member.

* * * * *